(12) United States Patent
Baker et al.

(10) Patent No.: US 10,534,879 B2
(45) Date of Patent: Jan. 14, 2020

(54) EDA DIAGNOSTIC CHECKER

(71) Applicant: SnapEDA, Inc., San Francisco, CA (US)

(72) Inventors: Natasha Baker, Toronto (CA); Garret Michael Fick, Shanghai (CN)

(73) Assignee: SnapEDA, Inc., San Francisco, CA (US)

( * ) Notice: Subject to any disclaimer, the term of this patent is extended or adjusted under 35 U.S.C. 154(b) by 956 days.

(21) Appl. No.: 15/055,762

(22) Filed: Feb. 29, 2016

(65) Prior Publication Data
US 2017/0249410 A1    Aug. 31, 2017

(51) Int. Cl.
*G06F 17/50* (2006.01)

(52) U.S. Cl.
CPC ................. *G06F 17/5036* (2013.01)

(58) Field of Classification Search
None
See application file for complete search history.

(56) References Cited

U.S. PATENT DOCUMENTS

| 8,949,203 | B1 * | 2/2015 | O'Riordan | G06F 17/5081 |
| | | | | 707/694 |
| 2005/0049883 | A1 * | 3/2005 | Boroson | G06F 17/50 |
| | | | | 705/26.1 |

OTHER PUBLICATIONS

Mentor Graphics, "Calibre nmDRC" Datasheet, Jun. 2011, 4 pages. (Year: 2011).*
Valor DFM Validation and NPI, pp. 1-3 (https://www.mentor.com/pcb/xpedition/npi/) (Accessed Feb. 26, 2018).
Sam Sattel, Design Rule Check: PCB Layout, pp. 1-4 (https://www.autodesk.com/products/eagle/blog/design-rule-check-pcb-layout-basics-3/) (Accessed Feb. 26, 2018).
Zuken PCB Analysis and Verification, p. 1 (https://www.zuken.com/en/products/pcb-design/cadstar/products/pcb-analysis-and-verification) (Accessed Feb. 26, 2018).
HyperLynx Design Rule Checking (DRC), pp. 1-3 (https://www.mentor.com/pcb/hyperlynx/electrical-rule-check/) (Accessed Feb. 26, 2018).
Valydate, p. 1 (http://valydate.com/) (Accessed Feb. 26, 2018).
PCB Libraries, p. 1 (http://www.pcblibraries.com/) (Accessed Feb. 26, 2018).

* cited by examiner

*Primary Examiner* — Suzanne Lo
(74) *Attorney, Agent, or Firm* — Cognition IP, P.C.; Bryant Lee

(57) ABSTRACT

A system for evaluating CAD models automatically and transmitting the results of a series of algorithm-based checks. An evaluation model is read in by the system and its parameters are evaluated for self-consistency and conformance to a set of diagnostic rules. Results are returned or displayed interactively upon viewing, transmitting, or inspecting a CAD component model, or placement of a CAD component model in an EDA software tool. The evaluation produces a result, which comprises the pass/fail results of the individual checks, and an indication of quality level. The system may additionally receive from an administrator a plurality of rules, suppressions or quality levels. The set of diagnostic rules comprises the plurality of EDA rules that are not associated with one of the plurality of suppressions.

11 Claims, 2 Drawing Sheets

"On Premise" Flow

"Remote" API Flow

EDA DIAGNOSTIC CHECKER

FIELD OF THE INVENTION

The present disclosure relates to the field of EDA (electronic design automation) software systems. More specifically it relates to an automated system for assessing the quality of electronic computer-aided design (CAD) and electronic design automation (EDA) component data ("CAD models").

BACKGROUND OF THE INVENTION

Traditionally electronics engineers and printed circuit board (PCB) designers ("engineers") have manually created CAD models for electronic components used in their designs. These CAD models include PCB footprints (or land patterns), schematic symbols, 3D models, simulation models, or any permutation thereof. This is a time-consuming process that results in duplicated effort across the industry. However, as the Internet plays a greater role in the electronic design process, engineers are increasingly relying on online sources to find readily available CAD models to download and use within their designs. These online sources include component manufacturer and distributor websites, Google searches, hardware design forums, cloud-based design tools that crowd sourced CAD models, online CAD libraries, and others. This shift in how engineers are sourcing CAD models is producing new challenges. Specifically, since CAD models can be sourced virtually from anywhere online, there is no way for engineers to gauge the quality or limitations of the CAD models they are sourcing without manually studying them. The CAD models they find online are essentially "black boxes" that provide little to no transparency into the standards they follow, their self-consistency with the physical component dimensions or other component characteristics, or their technical limitations.

CAD models are often created manually, which involves intricate, and therefore error-prone, work so there is a probability that engineers will source inaccurate models, or models that are insufficient for their applications. If inaccurate or insufficient CAD models are used in a design it can result in costly prototype iterations and delays that may result in manufacturability issues or more serious product failures.

To prevent these issues, existing processes require users to manually verify CAD models against multiple sources, such as datasheets or manufacturer's packaging specifications, in order to determine the validity of CAD models. This is a time-consuming process that nearly defeats the benefits of sourcing third party data in the first place. As a result, there is an urgent need for an automated system to assess the quality and limitations of CAD models.

BRIEF SUMMARY

In a key embodiment of the invention a software program evaluates CAD component models. The method comprises receiving a CAD component model over a computer network where the CAD component model comprises attributes, extracting data from the CAD component model, verifying the self-consistency of the attributes, comparing the CAD component model against a generated conjectured model to detect discrepancies, and returning or interactively displaying the discrepancies to a user upon viewing, transmission, or inspection of the CAD component model, or placement of the CAD component model in an EDA software tool.

The method may further comprise evaluating the CAD component model against a plurality of quality levels, comprising a prototype level and a production level to produce an indication of a quality level and interactively displaying the indication to the user.

The method may also comprise evaluating the CAD component model against a plurality of rules to produce a pass/fail indication and returning or interactively displaying the pass/fail indication to the user.

One embodiment of the invention includes a method for evaluating CAD component models. The method includes receiving a plurality of quality levels from a user, receiving a plurality of EDA rules from the user where each of the plurality of rules is associated with at least one of the plurality of quality levels, receiving a plurality of suppressions from the user where each of the plurality of suppressions associated with at least one of the plurality of rules, reading a component model in a native format from a non-volatile memory and converting the component model into a common format to produce an evaluation model, and evaluating the evaluation model against a set of diagnostic rules. The set of diagnostic rules comprises the plurality of EDA rules that are not associated with one of the plurality of suppressions. The evaluation produces a result which is transmitted to the user. The result comprises an indication of quality level and a pass/fail indication.

In some embodiments of the invention, the receiving and transmitting is done through an application programming interface.

In others, the plurality of quality levels comprises a prototype level and a production level, where the result having an indication of quality level of the production level will also have a quality level of the prototype level.

In further embodiments of the invention the result further comprises a manual correction application for modifying the component model or an automatic correction application for modifying the component model without intervention from the operator.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
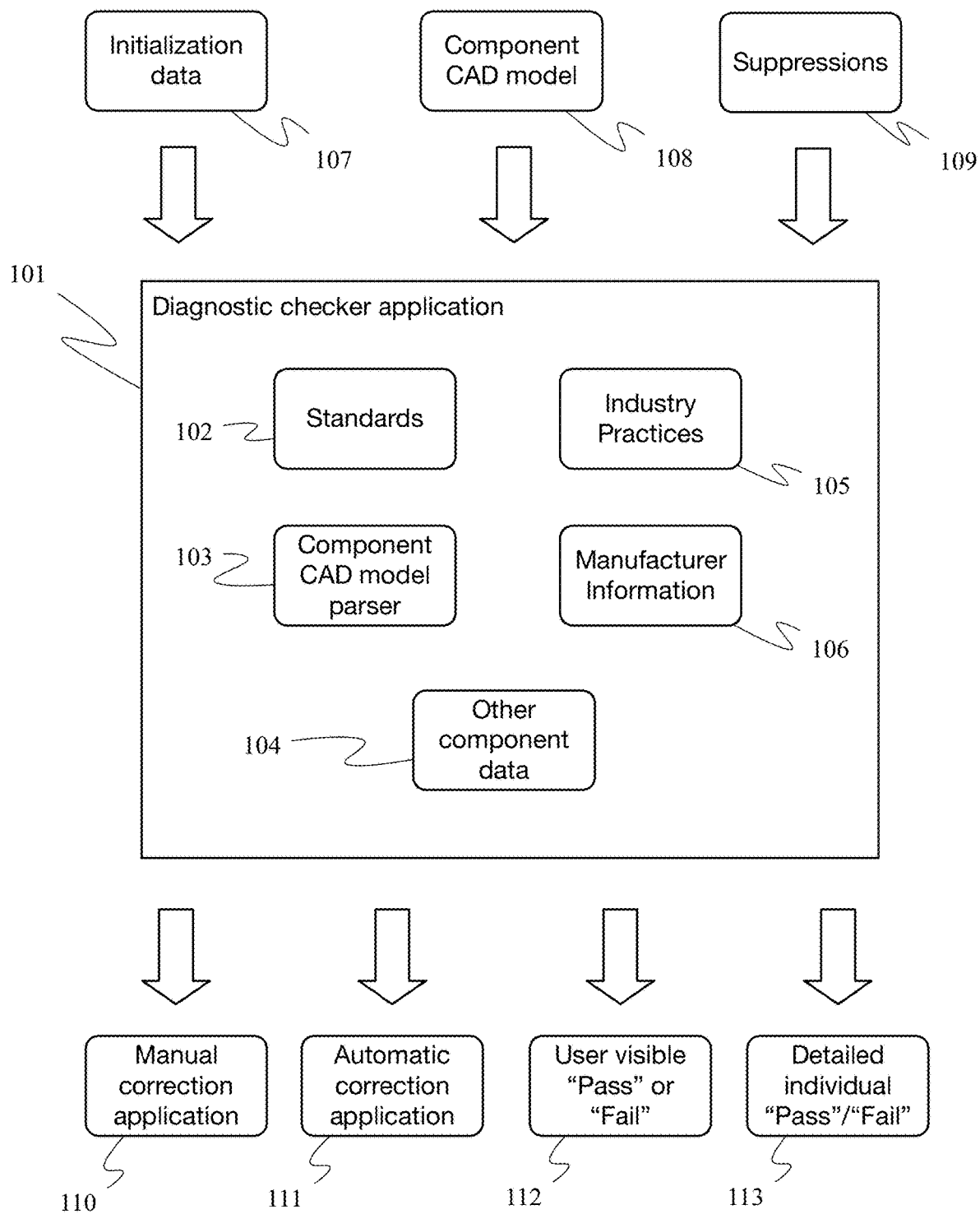
FIG. 1 is a diagrammatic illustration of the inputs, outputs and components of a diagnostic checker system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

One embodiment of the invention includes a system to automatically assess and visualize the quality of CAD models via a web-based interface or API (application programming interface), or EDA tool plugin to assess factors such as the self-consistency of its parameters or simulated characteristics, manufacturability of the data, and its compliance to industry, company, application, or other user-defined standards.

The CAD models themselves may be obtained from a variety of online and offline sources including the semiconductor manufacturers that produce the devices, EDA companies that produce software to design PCBs, firmware manufacturers, component distributors, universities, user-uploaded and crowd-sourced content, or other sources.

Referring to FIG. 1, a "diagnostic checker" 101 for CAD models 108, can be used on PCB footprints, schematic symbols, 3D models, simulation models, and any permutation thereof, that have been uploaded or viewed on a website, or whose data has been transmitted via a web service, or accessed through an API. The diagnostic checker may use a CAD model from a variety of sources as described above. The diagnostic checker performs a series of algorithmic checks 102-106 on a CAD model 108 to evaluate the quality, manufacturability, and compliance of the CAD model. The checks are conducted against predetermined or user-defined standards used as initialization data 107. The diagnostic checker then delivers the individual pass or fail results 113 of these checks, and a final graded assessment regarding the quality of the CAD model 112. The diagnostic checker may indicate the quality, operational limits, or industry standard that a CAD model complies with. It may be used for CAD models of unknown origins as it provides visibility into the CAD model's intended usage and quality, but is also useful for assessing CAD models of known origins.

Without the engineer needing to go through the process of manually evaluating a CAD model, the diagnostic checker 101, provides a framework that performs a series of pre-set or user-defined checks on a CAD model by extracting parameters and attributes from the CAD model to determine if the data is correct for a particular electronic component and for the application or standards required. The system works by extracting data in the files to create a conjectured model for its tests and then compares the conjectured model against an actual CAD model for a particular set of rules or checks. Since the CAD model encodes the same information in multiple locations in its file or files, the system is able to compare the data extracted in various places to determine its self-consistency for the particular electronic component. For example, with a PCB footprint, the name of the CAD model may encode some information, the lines and shapes of the footprint encode other information, industry standards further encode information, and datasheets contain more information, as do other CAD models. The system thus compares and cross-references these sources, weights them to automatically find sources of errors in the CAD model, and displays the results of each check performed on the CAD model to the end-user. To provide a further example, the name often includes spacing information encoded within it. This can be cross-referenced against both the actual spacing of the PCB footprint pads extracted from the 2D model, and also the component physical packaging data to verify self-consistency. Further, industry standard data, such as JEDEC packaging data, also provides this information for further cross-referencing. The system would thus compare these various instantiations of the data to check for consistency and display the results of the pin spacing check to the end-user together with pass/fail results.

The diagnostic checker extracts data embedded within the CAD model source code to build a conjectured model that is intended to represent the ideal representation of that CAD model based on pre-defined rules. Based on this, the system then cross-references various parameters in the CAD model across various data sets to determine whether the CAD model is self-consistent based on the CAD model that should be represented, and cross-referencing these insights against multiple data sources to validate the self-consistency of the model, and determine whether or not a particular rule passes or fails.

The system involves running a sequence of algorithms through a CAD model's raw source code for the purpose of extracting data that can be used to generate a conjectured CAD model. A conjectured CAD model may be a representation of the ideal instantiation of the CAD model for the Manufacturer Part Number (MPN) and CAD model type it is projected to represent. It may also include calculations or interpolations of data to fill in or improve the representation. The conjectured CAD model may be used to check for self-consistency within the CAD model itself. There are several ways the system determines the CAD file it is supposed to represent. One method is via the name or file name of the CAD model under examination. This assumes that it may represent a component's Manufacturer Part Number (MPN), adhere to an industry-standard naming convention, or can provide transparency into other factors such as its package type. The system pairs extracted data with data pulled in from third party data sources to build a conjectured model which also factors in a set of pre-defined rules that the CAD model is expected to pass. The conjectured model and the actual CAD model are then compared and checked against this set of rules for self-consistency. The rules can either be based on industry or manufacturer standards, or be user generated. If the result of a rule produces discrepancies between the conjectured model and the actual CAD model, then that rule has failed.

The system also supports suppressions that may be placed with a CAD model or via a user interface or API to prevent a particular rule from being assessed for that CAD model. The set of diagnostic rules performed on a CAD model comprises the plurality of EDA rules that are not associated with one of a plurality of suppressions.

As shown in FIG. 1, the initialization data 107, model 108, and suppressions 109 are the set of inputs to the diagnostic checker 101. The checker then sequentially evaluates rules against the model. Each rule has a specific result (pass, fail or undetermined) and output that further refines the expected attributes of the model. These outputs are compared against each other and form additional inputs for additional checks. Outputs include reports, applications, or user interfaces to allow for the manual correction of models 110, applications to automatically correct deficiencies in models 111, a high level pass or fail indication 112, and a detailed pass or fail report 113 that provides information on the rule that failed or the quality level that was not achieved, as well as what further information is required to achieve a pass.

The diagnostic checker 101 can be customized using initialization data 107 or settings by a user to define the individual checks it performs and how the grading system determines the permutation of checks that must be passed for different levels of grading. These checks can be customized either via a web-based portal, or through a web service. For example, some users may want IPC (Association Connecting Electronics Industries) compliance on their PCB footprints in order to provide a passing grade.

In some embodiments of the invention a universal reader reads in the various model formats and translates them into a common internal format. The component CAD model parser 103 takes as an input CAD models in the common internal format, native format, or one of a variety of commonly used industry or de facto industry standards and parses them for diagnostics. Diagnostics may then be run on the model in the universal format. In another embodiment of the invention, the diagnostics are run on each model in its native format. The CAD data could be in any readable format or may be encrypted to protect proprietary information.

In addition to displaying and returning individual checks that have passed or failed, the diagnostic checker also provides an overall grade for the CAD model 112. At a high level, it returns a Pass or a Fail result. Pass also contains additional qualifiers to determine CAD model quality; "prototype" and "production" being two examples. A prototype qualifier is a subset of a Pass grade and indicates that this CAD model can be used for development and testing purposes, but is riskier to use in higher volume production. A production qualifier is another subset of a Pass grade and indicates that this CAD model is of higher quality and can be used for larger scale production and complies with all the rules defined in the diagnostic checker.

Each rule may be assigned an importance or weighting. The importance is determined from multiple sources, including both pre-assigned information, standards, and user-preference. The overall quality of the component is determined by the highest-level where there are no failed rules. Suppressed rules, indicated by suppressions, are ignored for calculating the overall quality of the model.

The system can be accessed in two ways. One is as a web-based visual diagnostic check that delivers the assessment of a file uploaded for online viewing. Another is through an application that utilizes an API that allows a CAD model to be analyzed remotely with the assessment transferred back to the sending application or another application. This allows third party applications to use the results to verify its own data, or build its own unique applications. For example, an application could be built that would programmatically resolve errors found and deliver a CAD model that has been adapted based on the algorithmic checks 101 specified as inputs.

The system may also implement "suppressors" 109. Suppressors are additional information included within a CAD model to suppress particular checks in order to change the expected results of the diagnostic checker. The suppression data may optionally include informational justification for the suppression, such as a deviation from various standards for a particular purpose.

The diagnostic checker in one embodiment of the invention consists of multiple independent and interdependent checks that enable the checker 101 so that the checks must be both satisfied individually and across the entire range of component attributes. Checks may be made against formal standards 102, industry best practices 105, manufacturer information 106, or other component data 104.

The diagnostic checker may be initialized 107 with predefined information and real-time gathered information describing norms for manufacturing, component manufacturer capabilities, component manufacturer standards, manufacturing capabilities and standards, industry standards, and user-defined preferences and standards.

A component model is entered into the checker. The model contains both the model itself and may also contain additional information about the model and suppression information about how to interpret the output from the rules.

For example, the footprint or land pattern name fits the standards for a DIP package is output from a rule. The package pins type, whether through hole or surface mount is output from anther rule. The total number of pins is output from another rule. Whether a component manufacturer has specific capabilities such as creating DIP components is output from another rule. Each of these rules are evaluated individually. Examples include;

Does the footprint or land pattern name follow a standard?
Is the package all through hole or all surface mount?
Is the total number of pins typical for a through hole component, and
Does the manufacturer make through hole components?

Checks may include but are not limited to the following examples:

Verifying the footprint or land pattern name follows a standard naming conversion.
Verifying that a CAD model's symbol-to-footprint mapping matches the datasheet.
Verifying that a CAD model uses the appropriate package type.
Verifying that a CAD model's copper lands adhere to calculated standards, whether industry-standards like IPC or user-defined standards.
Verifying there is sufficient distance between exposed copper on a land pattern and silkscreen.
Verifying that the land pattern orientation adheres to industry or user-defined preferences.
Verifying the presence, sizing, and placement of particular attributes, such as pin 1 indicator.
Verifying that symbol pin names match the expected pin names on the datasheet.
Verifying that no pins are missing from the footprint that exist on the symbol.
Verify that the 3D model aligns with the footprint or land pattern to validate its attributes.
Verify that the footprint or land pattern aligns with the 3D model to validate its attributes.
Verifying that the footprint or land pattern aligns with a database of life-size component images.
Verifying that a footprint or land pattern's pitch matches the expected dimensions based on the naming convention of a standard.
Verifying that the directions or shapes on pins is consistent with the type of component, e.g., resistor should have passive pins, a clock pin should have a clock shaped input.
Verifying that the direction or shape on pins is consistent with the name of the pin. e.g., VCC is usually a power pin.
Verifying that the component uses standard names of extra attributes.
Verifying that the component type is consistent with the package type. An example would be, does an oscillator have an oscillator package?
Verifying that the component name matches the symbol name.
Checking whether objects or the package body overlap footprint pads.
Checking that the actual number of footprint or land pattern pins matches the number expected by the package name.

Checking that pads are placed as they are expected based on the package type.

Counting the number of different shapes of footprint or land pattern pads (for package statistics).

Verifying that the centroid of a footprint or land pattern is at 0, 0 for certain package types Verifying that a footprint or land pattern uses one of a common set of pitches based on its package type Verify that SMD components only have pads on the top layer Verify that shapes and text are on appropriate documentation layers.

The system also performs checks related to the various layers of the CAD models such as the top PCB layer, inner PCB layers, bottom PCB layer, power and ground layers, solder mask and silkscreen layers. For example, there may be checks for the completeness of appropriate solder masks. These outputs are then combined for further processing to evaluate the quality of the model.

The model may also encode additional information about the model itself for the purpose of disambiguation and self-consistency. For example, component naming standards do not specify the number and attributes of thermal pads and the component may contain additional information that describes the expected qualities of these pads. This can help avoid "copy-paste" errors because the additional information is edited separately from the model itself, and the rules use this data to check the model.

The rules iteratively or sequentially narrow down the expected qualities of the model so that the model's quality can be evaluated with high precision.

A rule that cannot be run because of insufficient information is marked as either failed or undetermined, as appropriate.

The result of each check is then compared to any suppression information contained in the model or supplied by the end-user. The suppression information does not change the result of the check, but can change how failed or undetermined results are presented to the end user.

The checks that the system performs can include schematic symbol to PCB footprint pin mappings, PCB footprint and 3D model dimensions, simulation model characteristics, compliance to industry standards (such as IPC), or other user-defined standards (for company or application-specific rules). It may also compare data contained only within an individual CAD model without cross-referencing other sources, for example comparing PCB layer data to show attributes such as whether the silkscreen layer contains the same X, Y coordinates as the copper layer.

Figure 2:
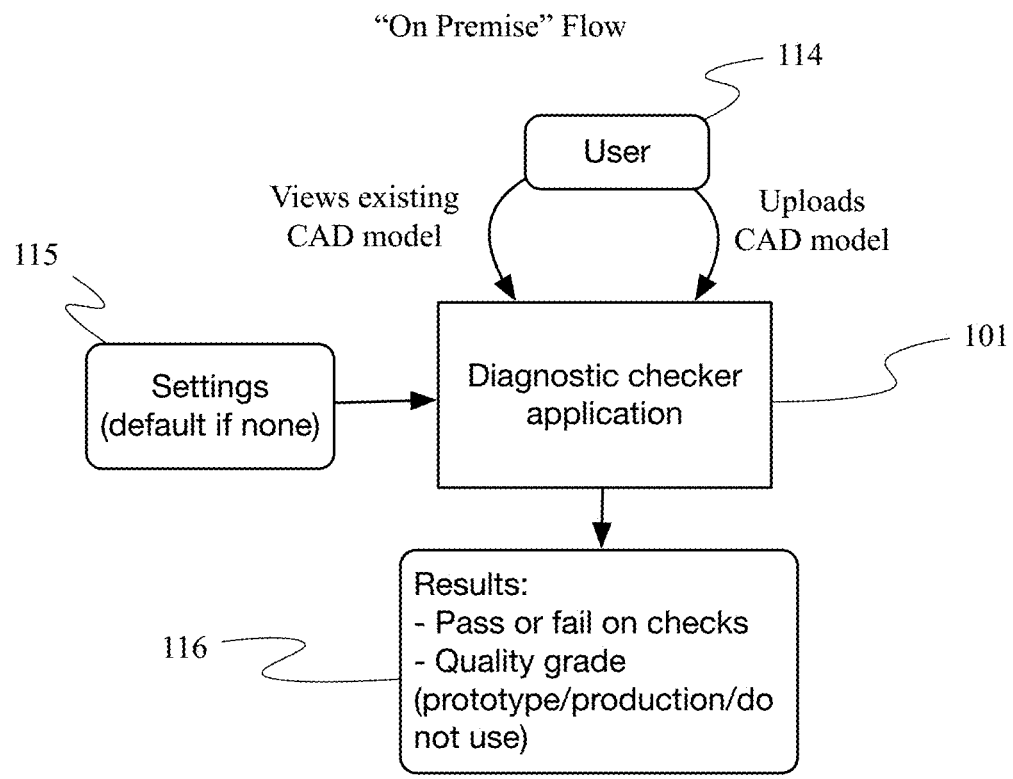
FIG. 2 is a diagrammatic illustration of the workflow for a user of the system.

A user 114 or designer utilizes the diagnostic checker system 101 as illustrated in FIG. 2. The user defines the settings 115 which includes rules to apply at the various quality levels. Default quality levels may be defined by the system and include prototype, production, and do-not-use. Prototype quality is sufficient to use for experimental, development, or proof-of-concept designs where the production quantity is small and the hardware, firmware, and software designers are present to troubleshoot, debug, and otherwise give aid if necessary. Production quality is for large production runs of product that will ship to customers and must function reliably. Do-not-use are for models that fail a specified check and cannot be reliably used in any design. This would include models missing specific required information that make it unusable. It may include models that have conflicting or inconsistent information such as the package type, number of pins, footprint, or signal names. An example would be if the symbol to footprint mapping does not match the datasheet.

The user 114 may use these default quality levels and may also specify more of their own. The user may then apply rules to each of the defined quality levels. Rules may be organized into buckets to make them easier to manage. Buckets and rules may be organized hierarchically. Rules may be moved from one bucket to another bucket. In some cases, a company may have a bucket of corporate standard rules and other buckets for project specific rules. A design services company may have different buckets for each of their end customers as well as a default bucket.

Existing parameters extracted from CAD models can be combined to allow users to produce custom rules that can be created by compounding together multiple parameters. One example would be to require that solder mask must be 0.5 times the copper pads. In this case the bolded elements are elements of existing rules that the user can combine in different ways to define new rules.

Rules include requirements for DRC (design rule check) processes and standards. Rules may be customized on a global or corporate basis, on a per customer basis, and on a per project basis among others. An examples of a default and customized rule is:

All copper must be minimum 0.3 mm away from silkscreen: This 0.3 mm can be customized to a company's own standards of 0.17 mm or 0.25 mm.

SOIC components must be oriented vertically (pin 1 at top left corner): This may be customized to require SOIC components be oriented horizontally (pin 1 at bottom left corner).

A user 114 may view existing CAD models in the system as well as their quality levels and whether they passed or failed checks.

The user may also upload new CAD models. When a model is loaded into the system it may be missing some required information to perform some of the required design checks. The system may provide a user or system administrator to upload additional information for the model or to correct errors.

The diagnostic checker application 101 outputs a result 116 that includes a pass or fail indicator, and an indication of the quality grade. This can be done as a separate report or can be an automatic pop up dialog box, or may be indicated by displaying the component in a particular color on the screen, with a particular icon, or in some other distinguishing manner.

The system may support the role of a system administrator, a designer, a reviewer or some other type of user role. Permissions may be applied for each role as required. Permissions may take the form of read, write, modify, view, etc. as is well known in the art regarding computer file systems.

The administrator role may be key for a larger organization when enforcing consistent standards on their designs. An administrator specifies rules that CAD model must meet based on their company's standards or may go with the default rules provided by the system provider. They can customize the details of each rule, and decide which rules apply for all quality levels. Some rules might not apply for the organization in which case these may be marked as inactive rules that are unassigned to any category. Inactive rules can be configured to not apply to any quality level during the checking process.

Figure 3:
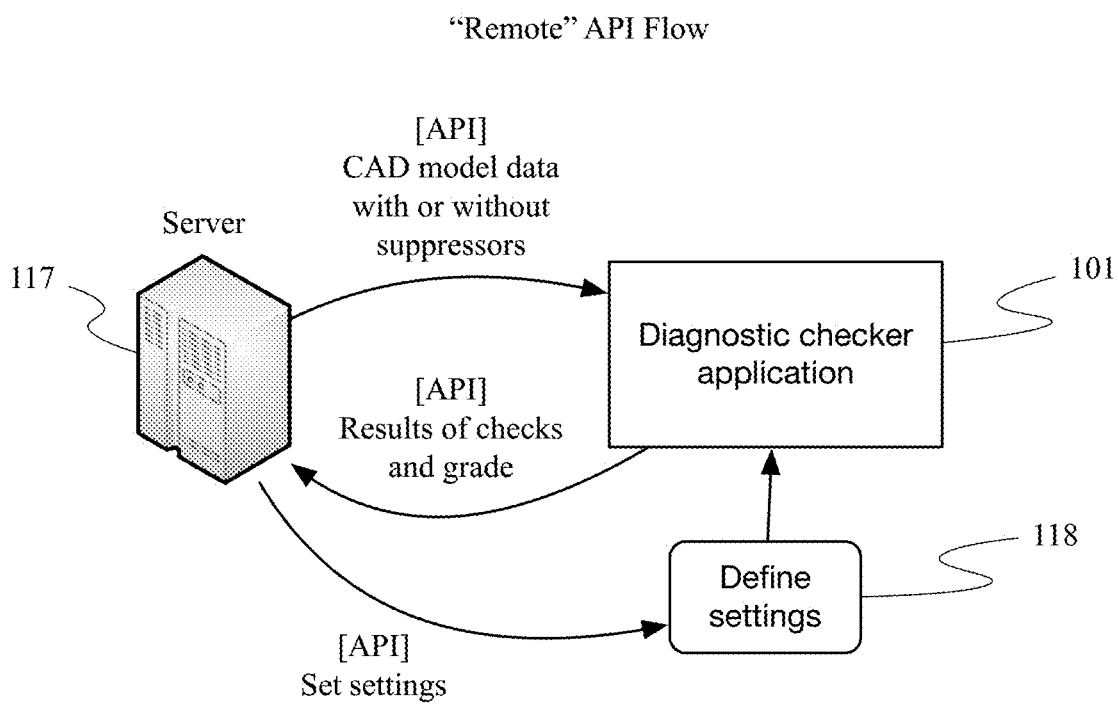
FIG. 3 is a diagrammatic illustration of the workflow for an administrator of the system.

FIG. 3 illustrates a workflow when the diagnostic checker 101 is accessed through an API. The third party application resides on a server 117 which may be a server in a traditional client-server architecture, a web based application, or a cloud computing application accessed through a web browser. It could also be a workstation running EDA software to manage CAD model libraries, to do schematic capture, PCB layout, PCB simulations, a dedicated CAD library management application, or any number of other similar software packages. The third party application running on the server 117 calls the API to optionally send a set of settings 118 to the diagnostic check application 101. If no settings are sent, then the system may use default settings. The third party application also sends the CAD model data, with or without suppressors to the diagnostic application 101. The diagnostic checker application 114 return the results of the check and a grade and other results to the third party application. The diagnostic checker application may run on a PC, server, web server, or in a cloud computing environment as is known in the art.

The system described above can also be integrated within electronic design automation (EDA) software, allowing CAD models to be analyzed in real-time upon placement within a schematic or in a layout and giving designers real-time analysis and feedback on the quality and limitations of the models they are using in their designs, whether sourced from their EDA software, created themselves, or sourced from a third party.

This system can be extended to other forms of computer-aided design (CAD) data data where a user would benefit from understanding and visualizing how well a model adheres to particular, relevant standards.

Similarly, the system can be used by semiconductor manufacturers to grade the quality of their components as well as the documentation supplied with their components. Any user-generated or automated content can be graded and checked for manufacturing issues using this system Although the algorithms described above including those with reference to the foregoing flow charts that have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules that perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for evaluating computer-aided design (CAD) component models, the method comprising:
    receiving a CAD component model over a computer network, the CAD component model comprising attributes;
    extracting data from the CAD component model;
    verifying the self-consistency of the attributes;
    generating a conjectured model for the CAD component model,
    the conjectured model generated by determining a unique product identifier of a product that the CAD component model is supposed to represent, the unique product identifier determined based on a name of the CAD component model,
    the conjectured model including one or more parameters based on the extracted data from the CAD component model and one or more parameters pulled from third party sources, the third party sources including at least datasheets, industry standards, or other CAD models, the third party sources being weighted to find sources of error,
    wherein the conjectured model approximates an ideal representation of the CAD component model;
    comparing the CAD component model against the conjectured model to detect discrepancies; and
    returning or displaying the discrepancies to a user upon inspection of the CAD component model or placement of the CAD component model in an electronic design automation (EDA) software tool.

2. The method of claim 1, further comprising evaluating the CAD component model against a plurality of quality levels comprising a prototype level and a production level to produce an indication of a quality level and displaying the indication to the user.

3. The method of claim 1, further comprising evaluating the CAD component model against a plurality of rules to produce a pass/fail indication and displaying the pass/fail indication to the user.

4. The method of claim 1, wherein the CAD component model is received over a computer network using an API.

5. The method of claim 1, wherein the generated conjectured model comprises attributes calculated by the EDA software tool.

6. The method of claim 1, further comprising automatically resolving the discrepancies without intervention from the user.

7. A method for evaluating computer-aided design (CAD) component models, the method comprising:
- receiving a plurality of quality levels from a user;
- receiving a plurality of electronic design automation (EDA) rules from the user, each of the plurality of rules associated with at least one of the plurality of quality levels;
- receiving a plurality of suppressions from the user, each of the plurality of suppressions associated with at least one of the plurality of rules;
- reading a component model in a native format from a non-volatile memory and converting the component model into a common format to produce an evaluation model;
- generating a conjectured model for the component model, the conjectured model generated by determining a unique product identifier of a product that the component model is supposed to represent, the unique product identifier determined based on a name of the component model,
- the conjectured model including one or more parameters based on the extracted data from the component model and one or more parameters pulled from third party sources, the third party sources including at least datasheets, industry standards, or other CAD models, the third party sources being weighted to find sources of error,
- wherein the conjectured model approximates an ideal representation of the component model;
- evaluating the evaluation model against a set of diagnostic rules, the set of diagnostic rules comprising the plurality of EDA rules that are not associated with one of the plurality of suppressions, the set of diagnostic rules comparing the evaluation model against the conjectured model, the evaluation producing a result; and
- transmitting the result to the user, the result comprising an indication of quality level and a pass/fail indication.

8. The method of claim 7, wherein the receiving and transmitting is done through an application programming interface.

9. The method of claim 7, wherein the plurality of quality levels comprises a prototype level and a production level, wherein the result having an indication of quality level of the production level will also have a quality level of the prototype level.

10. The method of claim 7, wherein the result further comprises data for modifying the component model.

11. The method of claim 7, wherein the result further comprises data for modifying the component model without intervention from the user.

* * * * *